Dec. 17, 1935.            B. T. HOLMAN            2,024,926
                        OIL PRESSURE SWITCH
                        Filed May 23, 1933
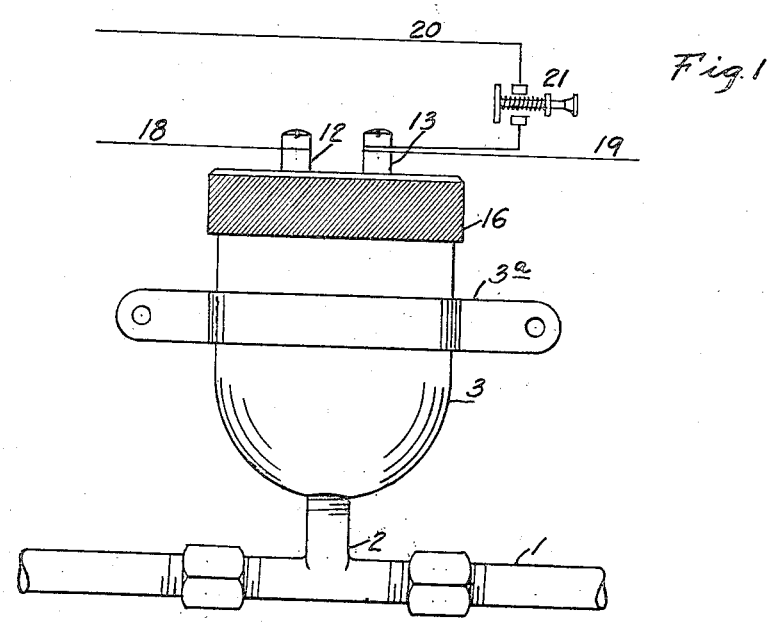
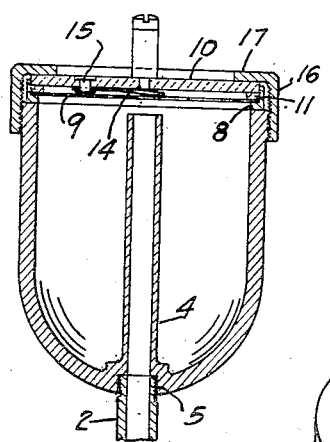
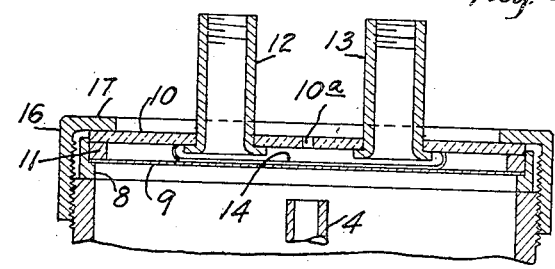
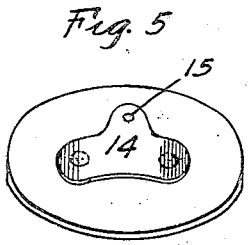
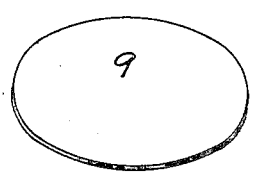
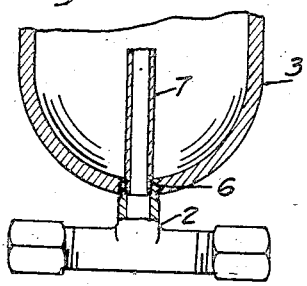

Patented Dec. 17, 1935

2,024,926

UNITED STATES PATENT OFFICE 2,024,926

OIL PRESSURE SWITCH

Benjamin T. Holman, Monaca Borough, Pa., assignor to Holman Safety Manufacturing Company, Pittsburgh, Pa., a corporation of Pennsylvania Application May 23, 1933, Serial No. 672,425

3 Claims. (Cl. 200—83)

Although my invention is particularly designed for use in connection with motor vehicle engines, it is likewise advantageously applicable to all types of internal combustion engines wherein the oil is supplied by means of forced feed.

In modern internal combustion engine practice the oil is supplied to the bearings and parts in moving contact by means of pressure, and thus when from any cause the oil pressure falls below the safety limit, a sufficient supply of lubricant is no longer maintained and the continued operation of the engine will result in damage, such as burned out bearings.

Such failure may be caused either by a diminution in the oil supply or by failure of the pump or other source of pressure.

The object which I have in view is the provision of means independent of the watchfulness of the operator for automatically stopping the operation of the engine when the oil pressure fails or falls below the safety limit.

For the accomplishment of this purpose, my invention comprises an improvement in the ignition systems for internal combustion engines, wherein an automatic oil-controlled safety cut-out device is interposed in the ignition system, which device is maintained in its closed position to complete such system as long as the proper oil pressure is maintained, but is automatically opened, interrupting the ignition system when the oil falls below a predetermined pressure.

My improved safety cut-out device comprises a diaphragm chamber in which the same pressure is maintained as in the oiling system of the engine and as long as said pressure is maintained the ignition system of the engine is complete, but when said pressure falls below the safety point the diaphragm in said chamber relaxes and causes an interruption in the ignition system.

Oil controlled safety devices for internal combustion engines have been previously designed but their operation has not been commercially satisfactory. One fault has been the delay in establishing sufficient pressure in the safety device to complete the ignition circuit when the engine is started.

I overcome this fault by maintaining a body of lubricant at all times in the diaphragm chamber, preventing material drainage when the oil pressure fails. Thus when the engine is started the supply of oil in the chamber is quickly replenished and the diaphragm is almost instantaneously expanded and the normal ignition circuit completed.

Means are provided whereby the operator may temporarily complete the ignition system to start the engine, which means are automatically rendered inoperative when the engine has been started or the working oil pressure is established.

Other novel features of construction and also of arrangement of parts will appear from the following description.

In the accompanying drawing wherein I have illustrated a practical embodiment of the principles of my invention, Fig. 1 is an elevation showing my invention applied to the ignition system and oil pressure line of an internal combustion engine.

Fig. 2 is a vertical section showing the preferred form of the diaphragm chamber.

Fig. 3 is a like view of a modified form of the same.

Fig. 4 is an enlarged broken vertical section of the diaphragm chamber and associated parts taken on a plane parallel to that of Fig. 1.

Fig. 5 is a perspective showing the insulating disk and the spring contact member, the disk being inverted.

Fig. 6 is a perspective of the diaphragm.

Referring to the drawing, 1 represents pressure oil supply line of the internal combustion engine in which is interposed the T-fitting 2 with its stem extending upwardly. 3 is the diaphragm cup which is mounted on the upwardly extending stem of the fitting and whose open top is exteriorly threaded.

The cup 3 is preferably of the construction shown in Fig. 2 and cut from a block of brass with an integral stand pipe 4 extending upwardly therein to a short distance, say about one sixteenth of an inch below the plane of the top of the cup. The bore of standpipe is open through the bottom of the cup and is countersunk and threaded as at 5 adjacent to its lower end so that the cup may be mounted in a vertical position by screwing it onto the upwardly extending stem of the T-fitting. 3a represents a metal strap by means of which the cup may be mounted on a convenient portion of the vehicle.

However the standpipe may be a separate element, as shown in Fig. 3 wherein the bottom of the cup is provided with a threaded hole 6 by means of which the cup may be screwed onto the stem of the fitting 2, and the standpipe may be a smaller tube 7 whose threaded lower end is screwed into the interiorly threaded stem of the T-fitting. Again the tube 7 may be soldered in place.

However, I prefer the construction illustrated in Fig. 2 as the same is less expensive to manufacture and the elevation of the upper end of the standpipe relative to the top of the cup can not be changed as it may be in connection with the structure illustrated in Fig. 3.

8 represents a gasket of compressible material and of L-shaped cross sectional form which rests on the upper end of the cup 3, and 9 represents a diaphragm which fits down in said gasket to close the upper end of the cup. Said diaphragm may be formed of any suitable flexible material, such, for instance, as thin sheet brass.

10 represents a stiff disk of fibre or other suitable nonconducting material which seats down in the gasket 8. I prefer to interpose a metal spacing ring 11 between the diaphragm and disk.

12 and 13 represent a pair of tubular terminal posts, preferably made of brass, which are rigidly fixed to the fibre disk 10, the base of said posts being exposed at the inner or under side of said disk.

14 represents a spring metal contact plate of conductive material which is secured to the under or inner side of the disk 10 as by means of a rivet 15. The disk is bowed transversely as shown in Figs. 4 and 5 so that normally it is out of contact with the inner ends of the posts 12 and 13 and preferably rests lightly upon the diaphragm 9.

16 represents an annular cap provided with a depending internally threaded flange which is screwed on the top of the cup, and also with an inwardly overhanging flange 17 which bears on the disk 10 forcing it downwardly to hold the parts in place and to compress the gasket 8 to prevent the escape of oil from the cup past the diaphragm 9.

18 and 19 represent one of the lead wires of the ignition system which is interrupted, the ends being connected to the posts 12 and 13 as by screws.

When there is no oil pressure in the line 1 and the cup 3 the diaphragm 9 is retracted and the spring contact plate 14 is out of contact with the bases of the posts 12 and 13, but when the pressure is applied to the oil the diaphragm is expanded upwardly, forcing the contact plate into electrical contact with the posts 12 and 13 and thus completing the conductor 18—19. However should the pressure fall in line 1 and consequently in the cup 3, the diaphragm will contract, allowing the contact plate to spring away from the posts 12 and 13, thus interrupting the conductor 18—19 and thus stopping the engine. To prevent back pressure above the diaphragm I provide the disk with an air port 10a.

Thus while the oil pressure is maintained the ignition system is complete but if the oil pressure falls below the predetermined safety limit then the ignition system is automatically interrupted and the operation of the engine ceases.

Insomuch as the pressure in the oil line will be below operating pressure when the engine is not going, I provide means for temporarily connecting up the ignition system when the engine is to be started. Thus I provide a by-pass conductor 20 in the ignition system which is connected to the binding post 13, to which the conductor 19 is also connected, and said conductor 20 has inserted therein a spring-opened switch 21, which in the case of a motor vehicle may be mounted on the instrument board and which in the case of a stationary combustion engine may be mounted in any convenient place.

When the operator desires to start the engine he pulls the switch 21 closed and holds it closed while he is working the starter and until the engine has started and the proper pressure is established in line 1. He then releases the switch and the spring opens the same, interrupting the by-pass conductor 20, and the engine thereafter maintains its operation owing to the fact that sufficient oil pressure is now maintained in the line 1 and in the cup 3 and thus the binding posts 12 and 13 have been electrically connected by the contact plate 14, thereby completing the conductor 18—19.

The function of the standpipe in the cup is to maintain at all times a body of oil in the latter so that when the oil pressure fails or falls below the safety limit, the cup will not be drained but will remain almost filled however with the top of the oil out of contact with the diaphragm. Thus when the proper pressure is reestablished the admission of a relatively small quantity of additional oil is required to extend the diaphragm and complete the ignition circuit.

This is a very important consideration, since if the cup were fully or to a material extent, drained by the failure of or fall in pressure, the cup would require refilling when the pressure is reestablished before the ignition system would be completed. Thus the operator would be required to hold the switch 21 closed for quite a lengthy period before the ignition system could begin normal operation. This is particularly true in the case of the motor vehicles manufactured of late wherein oil lines of reduced capacity are employed.

With the standpipe extending up to within a short distance of the top of the cup, say within a sixteenth of an inch, the quantity of oil lost by drainage from the cup when the pressure falls is relatively slight and thus this small quantity is almost instantaneously replaced when the pressure is reestablished or in other words when the engine is started with the switch 21 held closed, and therefore the period within which said switch must be held closed is hardly more than a moment.

It is obvious from the foregoing that my invention is of great value. Frequently bearings are burned out because the oil supply has been dangerously diminished or has failed or the operation of the oil pump has either ceased or been impaired.

The operator of the motor vehicle may be unconscious of such an occurrence or he may feel that he can complete a trip before the bearings are injured. The result is burned out or very badly damaged bearings and engine parts.

With the use of my invention the operation of the vehicle is immediately halted when such failure occurs and the operator is compelled to have the oil supply replenished or the pump put into efficient operation before he can continue the normal operation of the vehicle.

I claim:—

1. In a self-contained safety pressure switch for use in the ignition system of an internal combustion engine which is provided with a lubricating oil supply under pressure, the combination of a vertically disposed receptacle having its upper walls cylindrical, a trap formed by a pipe extending upwardly within the receptacle and connected at its lower end with the pressure oil supply, a disk of insulating material closing the upper end of the receptacle, a metallic diaphragm mounted within the container adjacent said disk and insulated from the container, the inner end of the pipe being closely adjacent the diaphragm, said diaphragm sealing the oil from the disk, and binding posts carried by the disk and having their bases exposed at the inner surface of the disk and said posts protruding outwardly to be connected in the ignition system, said diaphragm when expanded upwardly by normal oil pressure in the receptacle being arranged to complete the circuit between the bases of said posts but breaking the circuit when the failure of oil pressure causes the diaphragm to retract.

2. In a switch for completing the ignition circuit of an internal combustion engine which has an oil lubricating system under pressure, the combination of a sludge trap comprising an oil chamber having vertically disposed upper walls, a diaphragm closing the top of said chamber, contacts interposed in the ignition circuit and arranged to be closed by the upward expansion of said diaphragm, and means connecting said chamber with the oil lubricating system to expand said diaphragm under normal oil pressure, said means opening into said chamber at a point closely adjacent the diaphragm to prevent such a material diminution of the oil in the chamber when the oil pressure falls as would produce a material lag in the subsequent closing of the switch, and also to at all times maintain the trap substantially full of oil.

3. In a switch for completing the ignition circuit of an internal combustion engine which has an oil lubricating system under pressure, the combination with an oil chamber, a diaphragm mounted normal to the wall of said chamber and closing the same, contacts interposed in the ignition circuit and arranged to be operated by the expansion of the diaphragm, of means connecting said chamber with the oil lubricating system to expand said diaphragm under normal oil pressure, said means opening into said chamber at a point closly adjacent the diaphragm and arranged to produce an effective oil pressure chamber and a relatively deep sludge trap, the surface of the oil in the trap forming one wall of the effective oil pressure chamber, thus providing a minimum pressure chamber.

BENJAMIN T. HOLMAN.